Aug. 13, 1940.         F. A. GILLICE         2,211,326
MULTIPLE COMPARTMENT CONTAINER
Filed Nov. 12, 1938
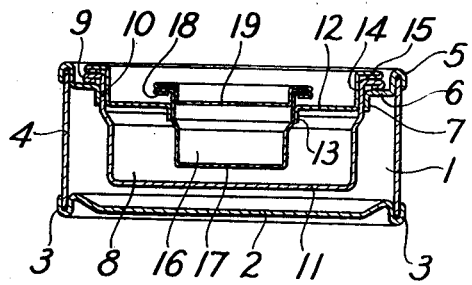
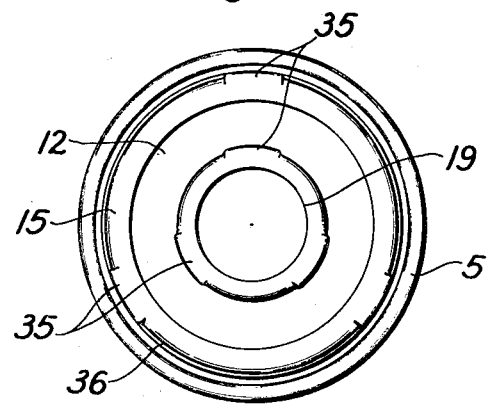
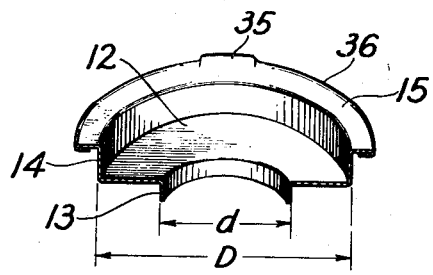
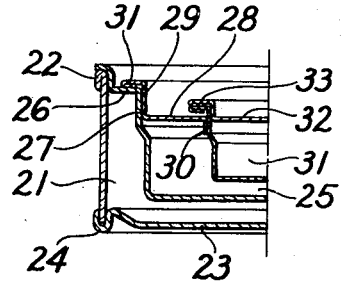
Freeman A. Gillice
INVENTOR
BY
ATTORNEYS Patented Aug. 13, 1940

2,211,326

UNITED STATES PATENT OFFICE 2,211,326

MULTIPLE COMPARTMENT CONTAINER

Freeman A. Gillice, Rochester, N. Y., assignor to Eastman Kodak Company, Rochester, N. Y., a corporation of New Jersey Application November 12, 1938, Serial No. 239,919

1 Claim. (Cl. 220—8)

This invention relates to containers and particularly to containers of the type in which a plurality of compartments are provided by a series of nested containers of different sizes, one being supported within another.

One object of my invention is to provide a multiple compartment container with one or more annular ring members which can be used as a part cover for one container, and, in addition, can be used to support a smaller size container in nested position. Another object of my invention is to provide a plurality of rings of various sizes so that different combinations of containers can be readily provided for, and so that the most desirable size of nested containers can readily be provided for any particular product. Another object of my invention is to provide containers with covers and part covers which can be so removed that the contents of each container can be readily removed without the necessity of removing the contents from beneath an inwardly projecting flange. Other objects will appear from the following specification, the novel features being particularly pointed out in the claim at the end thereof.

Coming now to the drawing, in which like reference characters denote like parts throughout:

Fig. 1 is an embodiment of a series of nested containers constructed in accordance with and embodying one form of my invention, the containers being shown in cross-section.

Fig. 2 is a top plan view of the nested containers shown in Fig. 1.

Fig. 3 is a perspective view shown partially in section of one of the rings which may be conveniently used to form a part cover for one container and a support for another container.

Fig. 4 is a fragmentary sectional view of another and a preferred embodiment of my invention.

With certain products, it is desirable to pack a number of different materials together and yet to keep these materials entirely separate until they are to be used. It is particularly desirable with containers, especially those of small size, to provide smooth, unobstructed openings through which the material may be removed, into which openings, covers may be held by friction. In the invention which will now be described, I have provided means for readily forming different combinations of containers so that the two or more receptacles may be selected of the desired capacity without necessarily requiring additional tools for producing the different types of containers.

Referring to Fig. 1, a three-compartment container is illustrated, the outer container 1 being cylindrical in shape and having a bottom 2, the edge flange 3 of which is securely attached to the cylindrical wall 4. The upper edge of this wall supports a rolled edge 5 of an annular member 6 having a downwardly extending flange 7 to frictionally support an outside wall of the first nested container 8.

This container may be provided with an outwardly extending flange 9 supported by an offset wall 10 adapted to frictionally engage the flange 7 of the ring member 6. The container 8 may have an integral bottom 11 and a part cover may be formed by a ring member 12, best shown in Fig. 3. As indicated in this figure, the ring member 12 is provided with an innermost downwardly extending flange 13, this flange lying substantially parallel to an upwardly extending flange 14 on the outer periphery of the ring member 12. From the upper edge of the flange 14 there projects outwardly a flange 15 so that this member not only forms a part cover for the container 8, but it likewise, by means of its downwardly extending flange 13, forms a support for the innermost container 16. This container may have a bottom wall 17, an outwardly flared upper flange 18 providing an opening which may be covered by the cover member 19.

This member frictionally engages the top of the container 16.

Thus it will be seen that the ring member 12 forms a part cover for the container 8, the remainder of the cover being formed by the container 16 and the cover 19.

A multiple compartment can constructed as above described has the advantage of providing a plurality of receptacles any one of which may be opened without opening all of the remaining covers. Thus, it is quite possible to empty the contents of any one container without disturbing the contents of the remaining containers.

A slightly different embodiment of my invention is shown in Fig. 4, in which the outer container 21 is provided with a rolled upper edge 22 and a bottom 23 which is fastened to the cylindrical walls of container 21 by a rolled-over edge 24. In this instance, a second container 25 is provided with an outwardly flared annular member 26 which frictionally engages the upper edge 22 of the can member 21 and which is provided with a shoulder 27 which frictionally supports a ring member 28 which is preferably constructed exactly like the ring member 12 of Fig. 2, that is, it has an upwardly extending flange 29 from the outer periphery of the ring and a downwardly extending flange 30 from the inner periphery of the ring. There is an outwardly extending flange 31 from the upper edge of flange 29 so that this member frictionally fits into the container 25.

The flange 30 may support an additional innermost container 31 which has a round cover 32 provided with an outwardly extending flange 33. Thus, in this container, as in the one previously mentioned, it is always possible to remove the covers or part covers so that the contents of any one can may be freely removed without obstructing flanges extending over any portion of the can to hinder the complete removal of the contents.

I prefer to provide the cover members and the part cover members with portions 35 which are bent outwardly with respect to the periphery 36 which is of rolled metal so that there is room to insert an opening instrument, such as a screw driver. This construction is well known and forms no part of my present invention which relates solely to the structure of the nested containers which are supported one within another so that a compact multiple compartment receptacle is formed which can be packed and stored quite as readily as the usual type of single compartment container.

What I claim as my invention and desire to be secured by Letters Patent of the United States is:

A multiple compartment can comprising an outer can formed with straight side walls, a second can positioned within said outer can and having the top edge thereof formed with an outwardly flared annular member adapted to frictionally engage the upper edges of said side walls so that said second can is supported in suspended relation on said outer can, said second can with its annular member providing a detachable closure cover for said outer can, a shoulder formed on said second can adjacent the top thereof, a ring member positioned within said second can and having an upwardly extending flange on the outer periphery thereof arranged to frictionally engage said shoulder to support said ring member therefrom, a downwardly extending flange formed from the inner periphery of said ring member, a third can formed with a shoulder adjacent the top thereof arranged to frictionally engage said downwardly extending flange, so that said third can will be supported in suspended relation therefrom, said ring and said third can providing a detachable closure cover for said second can, and a detachable cover frictionally engaging the shoulder of said third can to close the latter, said covers being separately detachable to provide an unobstructed opening for the cans to permit the contents of any can being removed without necessitating the opening of the remaining cans.

FREEMAN A. GILLICE.